United States Patent

Bolourchi et al.

[11] Patent Number: 5,919,241
[45] Date of Patent: Jul. 6, 1999

[54] VEHICLE HAVING ELECTRIC POWER STEERING WITH ACTIVE DAMPING

[75] Inventors: Farhad Bolourchi; Christophe Etienne, both of Saginaw; Ashok Chandy, Fenton; Nabeel Bitar, Saginaw; Mark Philip Colosky, Vassar, all of Mich.

[73] Assignee: General Motors Corporation, Detroit, Mich.

[21] Appl. No.: 08/766,270

[22] Filed: Dec. 13, 1996

[51] Int. Cl.$^6$ ........................................ B62D 5/04
[52] U.S. Cl. .............. 701/41; 701/42; 180/443; 180/446
[58] Field of Search .................. 701/41, 42; 180/443, 180/446, 412, 414, 422, 423; 318/432, 434; 74/388 PS

[56] References Cited

U.S. PATENT DOCUMENTS

| | | | |
|---|---|---|---|
| 4,660,671 | 4/1987 | Behr et al. | 180/446 |
| 4,664,211 | 5/1987 | Oshita et al. | 180/446 |
| 4,800,975 | 1/1989 | Oshita et al. | 701/41 |
| 5,257,828 | 11/1993 | Miller et al. | 180/79.1 |
| 5,406,155 | 4/1995 | Persson | 310/68 B |
| 5,473,231 | 12/1995 | McLaughlin et al. | 318/433 |
| 5,504,403 | 4/1996 | McLaughlin | 318/432 |
| 5,568,389 | 10/1996 | McLaughlin et al. | 364/424.05 |

*Primary Examiner*—Tan Q. Nguyen
*Attorney, Agent, or Firm*—Robert M. Sigler

[57] ABSTRACT

A vehicle with an electric power steering system has a steering shaft with a resonant frequency of free rotational oscillation and a control which derives a driver assist torque signal, a return to center torque signal and an active damping torque signal and sums these signals to provide a motor command signal to the electric motor. The active damping torque signal is derived by filtering a generated steering shaft position signal in a filter having amplitude and phase characteristics of a differentiator from zero Hertz only through the resonant frequency of free rotational oscillation of the steering shaft and multiplying the filtered steering shaft position signal by a vehicle velocity factor derived from sensed vehicle velocity. Preferably, the electric motor is provided with one or more rotor position sensors used in the control thereof and rotor position signals from the rotor position sensors are provided as the steering shaft position signal.

6 Claims, 7 Drawing Sheets

VEHICLE HAVING ELECTRIC POWER STEERING WITH ACTIVE DAMPING

TECHNICAL FIELD

The technical field of this invention is electric power steering for vehicles.

BACKGROUND OF THE INVENTION

Figure 2:
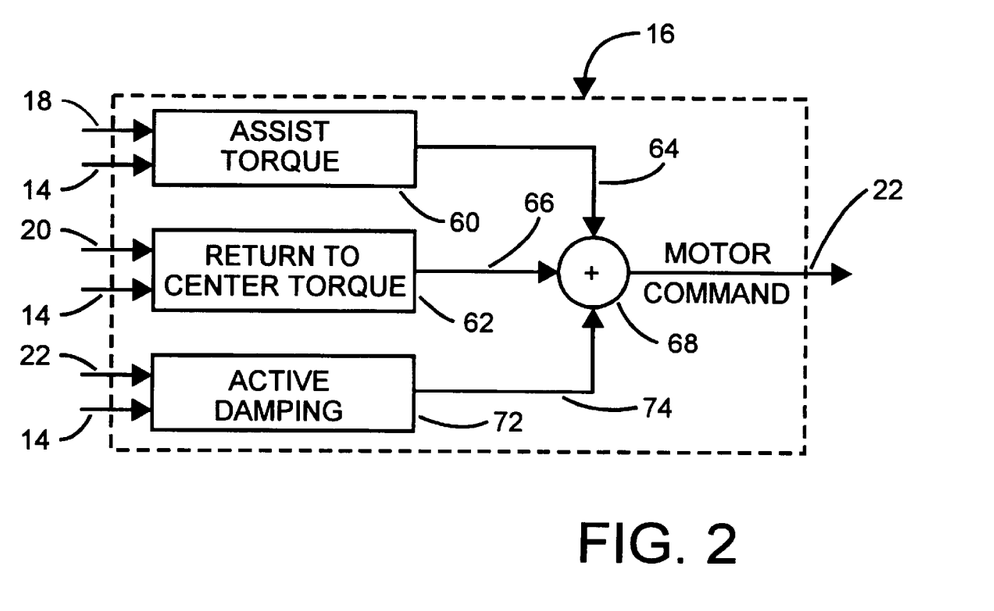
FIG. 2 is a block diagram of a controller for use in the electric power steering system of FIG. 1.

In a vehicle with electric power steering, the steering boost torque is provided by an electric motor coupled to the steering column. An example of such a system is described in U.S. patent application Ser. No. 08/538,155, Electric Power Steering Control, filed Oct. 2, 1995 and assigned to the assignee of this application. FIG. 2 of this application shows a controller 16 which derives an assist torque signal and a return to center or neutral position torque signal and sums these torque signals to produce a motor command signal. The first of these torque signals provides the power steering boost torque, and the latter provides return to center bias torque. However, the system has a free rotational oscillation resonance of about 2 Hertz which may not be satisfactorily damped by the apparatus shown. In order to provide a crisp, controlled feel to the steering, it may be advisable to provide active damping.

Alternatively, some vehicles may provide a return to center torque through the characteristics of their suspension systems without the need for such a torque to be provided by an electric power steering system itself. However, such vehicles may provide an overshoot in the return to center torque which makes active damping desirable.

SUMMARY OF THE INVENTION

The invention is an improvement to vehicles as described above with the addition of active damping. The improvement comprises means for generating and filtering a steering shaft position signal. The filtering means has amplitude and phase characteristics of a differentiator from zero Hertz through the resonant frequency of free rotational oscillation with amplitude and phase lead relatively decreasing, relative to those of a differentiator, at rotational oscillation frequencies greater than the resonant frequency of free rotational oscillation.

The improvement further comprises means for multiplying the filtered steering shaft position signal by a vehicle velocity factor derived from sensed vehicle velocity to provide an active damping torque signal and summing the active damping torque signal with the driver assist torque signal in providing the motor command signal to the electric motor. In an embodiment wherein the driver assist torque signal is summed with a return to center torque signal, the active damping torque signal is summed with both in providing the motor command signal to the electric motor.

Preferably, the electric motor is provided with one or more rotor position sensors used in the control thereof; and rotor position signals from the rotor position sensors are provided as the steering shaft position signal. These signals have adequate resolution and are available without additional cost, since they are necessary for electric motor control. In addition, signal range is no problem, since a digital filter algorithm is disclosed which operates on the differences between consecutive signals; and the difference between consecutive 12 bit rotor position signals may be clipped, by dropping insignificant zeros, to an 8 bit signal for more convenient processing.

DESCRIPTION OF THE PREFERRED EMBODIMENT

Figure 1:
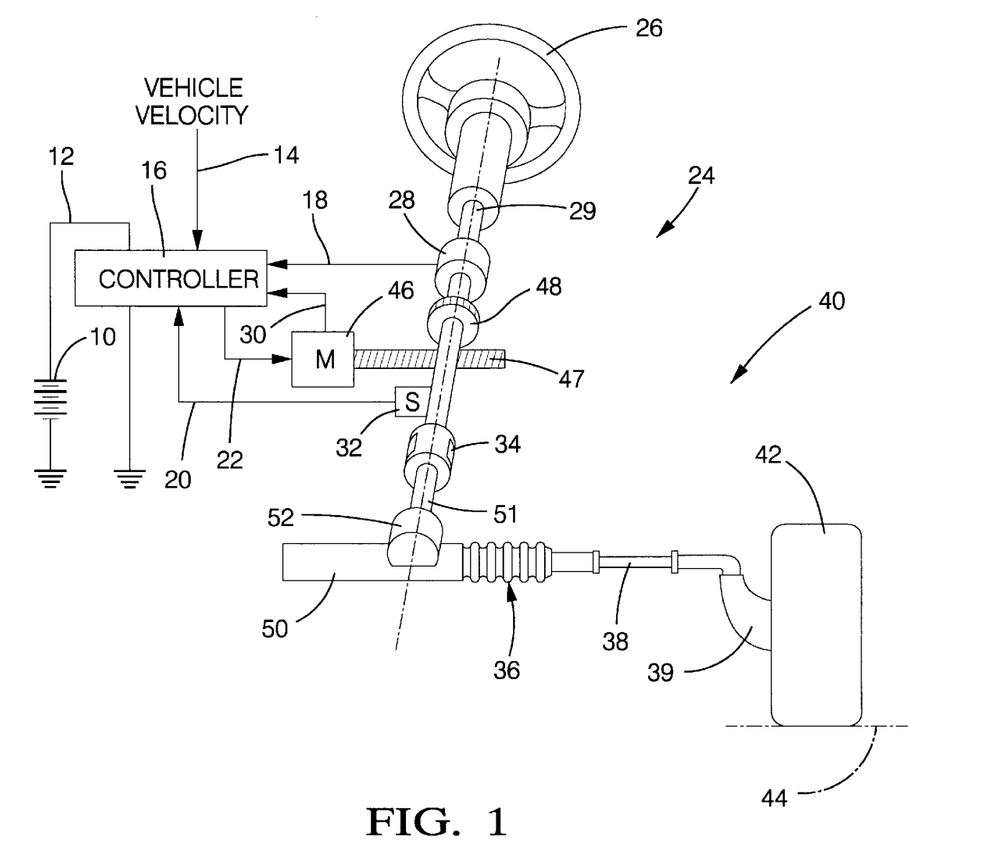
FIG. 1 is a schematic diagram of an electric power steering system according to the invention.

Referring to FIG. 1, a motor vehicle 40 is provided with an electric power steering system 24. Electric power steering system 24 may comprise a conventional rack and pinion steering mechanism 36, which includes a toothed rack 50 and a pinion gear (not shown) under gear housing 52. As steering wheel 26 is turned, an upper steering shaft 29 turns a lower shaft 51 through a universal joint 34; and lower steering shaft 51 turns the pinion gear. Rotation of the pinion gear moves the rack, which moves the rods 38 (only one shown), which move steering knuckles 39 (only one shown) to turn wheels 42 (only one shown).

Electric power assist is provided through a controller 16 and a power assist actuator comprising an electric motor 46. Controller 16 receives electric power from a vehicle electric power source 10 through a line 12, a signal representative of the vehicle velocity on line 14, and steering pinion gear angle from a column rotational position sensor 32 on line 20. As steering wheel 26 is turned, a torque sensor 28 senses the torque applied to steering wheel 26 by the vehicle operator and provides an operator torque signal to controller 16 on line 18. In addition, as the rotor of motor 46 turns, rotor position signals for each phase are generated within motor 46 and provided over bus 30 to controller 16. In response to the vehicle velocity, operator torque, steering pinion gear angle and rotor position signals received, controller 16 derives desired motor phase currents and provides such currents through a bus 22 to motor 46, which supplies torque assist to steering shaft 29, 51 through worm 47 and worm gear 48. If torque sensor 28 is the type which requires upper steering shaft 29 to be separated at the sensor between upper and lower sections allowing some range of rotational independence, both rotational position sensor 32 and worm gear 48 are associated with the lower section of the steering shaft, below torque sensor 28 as shown.

FIG. 2 shows a block diagram of controller 16, which, in this embodiment of the invention, implements three main functions. Block 60 determines the desired assist torque current representing the amount of motor current to be commanded responsive to the inputs of steering wheel torque on line 18 and vehicle velocity on line 14. Block 60 outputs a desired assist torque current command signal on line 64. Block 62 determines the amount of return-to-center torque current from the vehicle velocity on line 14 and the pinion gear angle on line 20 and outputs a desired return-to-center current command signal on line 66. Lines 64 and 66 are fed to summation block 68, where the magnitude of the return-to-center torque current command signal is subtracted from the magnitude of the assist torque current command signal. Further details of blocks 60 and 62 are found in the aforementioned U.S. patent application Ser. No. 08/538,155. An active damping block 72 of controller 16 determines an active damping torque current command signal, preferably from the motor position signals on line 22 and the vehicle velocity on line 14, and outputs the active damping torque current command signal on line 74 to summation block 68, where its magnitude is subtracted from the difference between the assist torque current command signal and the return-to-center torque current command signal. Alternatively, active damping block 72 may receive the pinion gear angle on line 20 rather than the motor position signal on line 22, as will be described below.

In an alternative embodiment, return to center torque block 62 may be omitted, since the vehicle chassis characteristics themselves provide a return to center torque. This embodiment is not shown separately, since it is the same as the embodiment of FIG. 2 absent block 62 and line 66.

Figure 3:
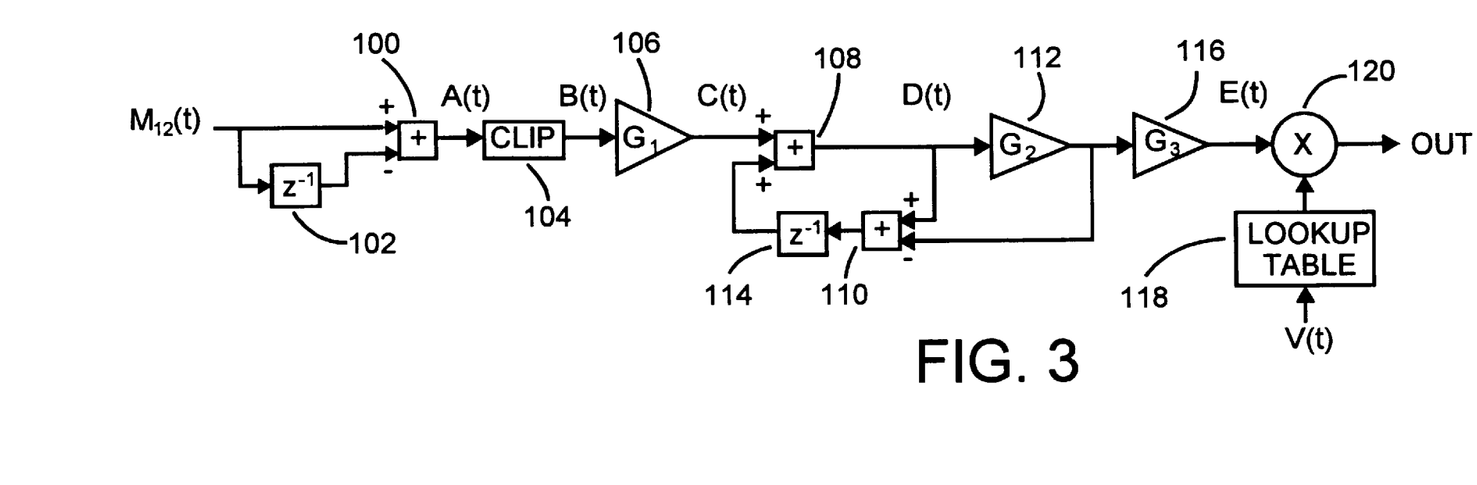
FIG. 3 is a block diagram of an active damping portion of the controller of FIG. 2.

FIG. 3 shows a schematic diagram of active damping block 72, which represents an algorithm implemented on a digital computer comprising controller 16. One input to active damping block 72 is a motor position signal indicating the position of motor 46. In this embodiment, motor 46 is a brushless DC motor which is directly coupled for rotation with pinion gear 52 through worm 47, worm gear 48 and steering shafts 29 and 51; and controller 16 includes control elements used in the control of such a motor. To provide rotor position signals used in such a control, Hall effect or similar position sensors of the type generally used with brushless DC motors are provided within motor 46; and these sensors generate pulses as they detect rotation of the motor rotor. Controller 16 includes a software implemented motor position counter for counting these pulses upward and downward, depending on the direction of rotor rotation, to provide a signal indicative of relative motor position. This signal comprises a 12 bit number which is appropriately incremented or decremented with the sensor pulses, with such pulses occurring about every 30 degrees of motor rotor rotation. Since the rotational ratio of motor 46 relative to lower shaft 51 and pinion gear 52 is about 20:1, the number is incremented or decremented about every 1.5 degrees of shaft rotation. Although motor 46 will rotate many times over the full range of steering wheel rotation, this is not important, since it is the relative position rather than the absolute position which is used in this algorithm and consecutive positions are close together, well within the capacity of the software counter.

Referring to FIG. 3, the latest value of 12 bit motor position signal $M_{12}(t)$ is provided as an input on line 22 to active damping block 72. Input $M_{12}(t)$ is fed to a positive input of a summing block 100 and also to a delay block 102, the output $M_{12}(t-1)$ of which is fed to a negative input of summing block 100. Delay block 102 provides a one cycle delay between its input and its output; therefore, the output A(t) of summing block 100 represents the one cycle change in input $M_{12}(t)$:

$$A(t)=M_{12}(t)-M_{12}(t-1)$$

A(t) thus represents the difference between two 12 bit position numbers separated by the cycle time of the computer run algorithm which, in this embodiment, is 16 milliseconds. In such a short time, the maximum expected change in the motor position counter is much smaller than its full 12 bit capacity. Therefore, for computational convenience, the number is clipped at 104 by the elimination of four non-significant zeroes to form an eight bit number B(t), which is handled with greater computational efficiency. B(t) is then multiplied by a scaling constant $G_1$ (128 in this embodiment) at 106 to form C(t):

$$C(t)=G_1B(t)$$

C(t) is then provided to the positive input of a summing block 108, the output of which is D(t). D(t) is provided to a positive input of another summing block 110 and also, after being multiplied by a cut-off frequency constant $G_2$ (¼ in this embodiment) at 112, is provided to a negative input of summing block 110. The output of summing block 110 is delayed one cycle in delay block 114 before being provided to another positive input of summing block 108:

$$D(t)=C(t)+(1-G_2)D(t-1)$$

D(t) is multiplied by constant $G_2$ at 112, as previously described, and by multiplier constant $G_3$ (¼ in this embodiment) at 116 to form E(t):

$$E(t)=G_2G_3D(t)$$

Finally, the vehicle velocity from line 14 is provided to a look-up table 118 to select a velocity multiplier $G_V$, which is multiplied times E(t) in multiplier block 120 to provide the active damping torque output $T_{AD}(t)$ on line 74:

$$T_{AD}(t)=G_VE(t)$$

In this embodiment, lookup table 118 provides three levels of velocity gain: zero gain at zero and very low velocities (e.g. below 8 kph), an intermediate gain value at medium velocities (e.g. between 8 and 20 kph), and a high gain value at high velocities (greater than 20 kph).

The output $T_{AD}(t)$ may also be responsive vehicle parameter inputs in addition to vehicle velocity through the multiplier $G_V$. For this, lookup table 118 may be provided with additional dimensions for the added inputs. For example, handwheel (steering wheel) position, handwheel velocity and/or torque may be provided in addition to vehicle velocity. Handwheel velocity could be obtained from the output of gain block 116; and torque could be obtained from torque sensor 28. However, handwheel position would be obtained from a handwheel position sensor, not shown, since an absolute handwheel position would be required but the algorithm deals in relative handwheel position.

Figure 4:
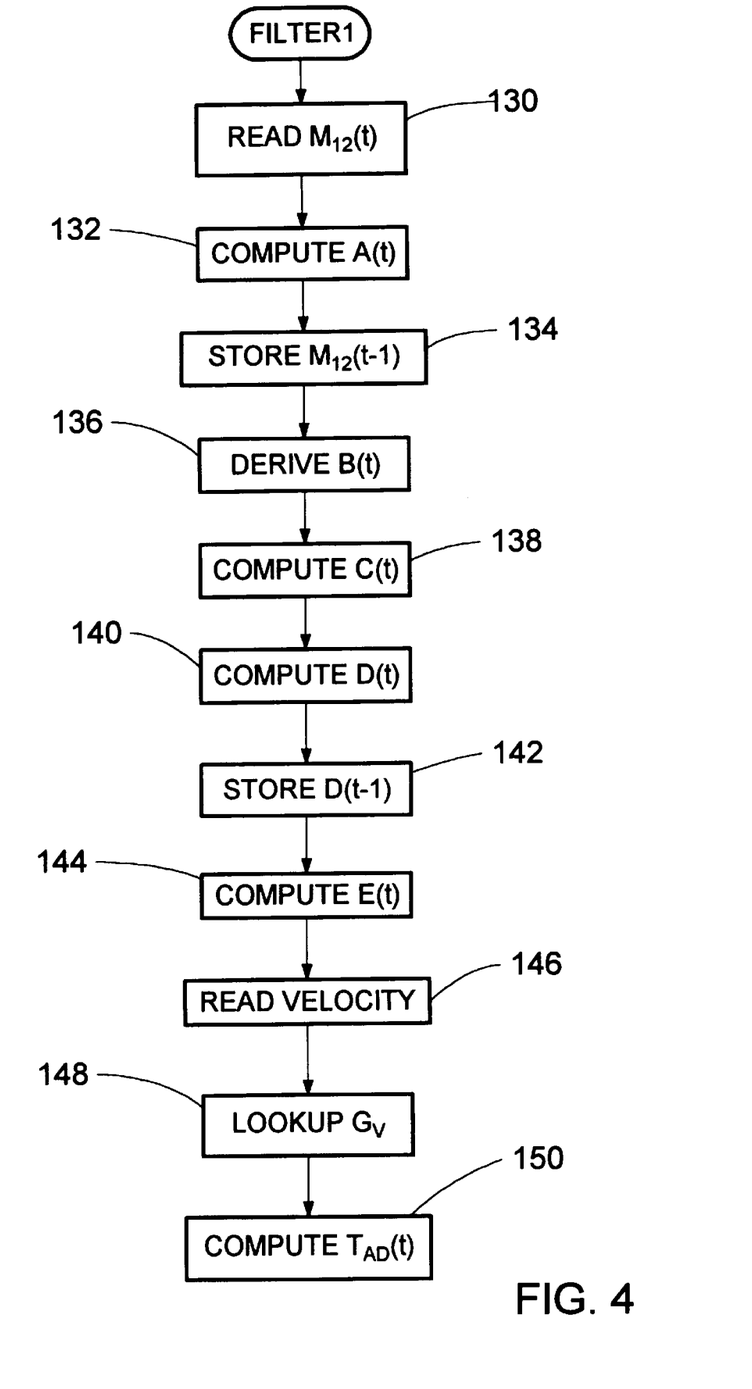
FIG. 4 is a flow chart illustrating the process of the block diagram of FIG. 3.

The flow chart of FIG. 4 shows the algorithm of FIG. 3 in a form adapted to a program for a digital computer. Program FILTER1 begins with step 130, in which the program reads $M_{12}(t)$. In step 132, the program computes $A(t)=M_{12}(t)-M_{12}(t-1)$. In step 134, the program copies the present value of $M_{12}(t)$ to $M_{12}(t-1)$ in preparation for the next loop. In step 136, the program clips the 12 bit A(t) to form the 8 bit B(t): $A(t) \rightarrow B(t)$. In step 138, the program computes $C(t)=G_1B(t)$. In step 140, the program computes $D(t)=C(t)+(1-G_2)D(t-1)$. In step 142, the program copies the present value of D(t) to D(t-1) in preparation for the next loop. In step 144, the program computes $E(t)=G_2G_3D(t)$. In step 146, the program reads the vehicle velocity V(t). In step 148 the program performs a table look-up on the vehicle velocity to derive the velocity multiplier $G_V$; and in step 150, the program computes $T_{AD}(t)=G_VE(t)$.

The algorithm described in FIG. 3 and 4 is a digital filter having, up to just above 2 Hz, an amplitude increasing steadily at 20 dB/dec and a constant 90 degree phase lead, and thus comprises a differentiator at the typical resonance frequency of free rotational oscillation of the vehicle steering column. The differentiated value corresponds to the time rate of change of pinion gear angle, which is multiplied by a gain constant increasing with vehicle velocity, so that greater control gain, and thus more damping, may automatically be achieved at higher vehicle velocities. Above 2 Hz, the amplitude no longer increases at the rate of a differentiator and there is a decrease in phase lead to zero degrees, so that the filter is not a differentiator above 2 Hz. Thus, the increasing gain of a differentiator is not present at frequencies greater than 2 Hz; and high frequency noise does not unduly affect free control of the steering column.

Figure 5:
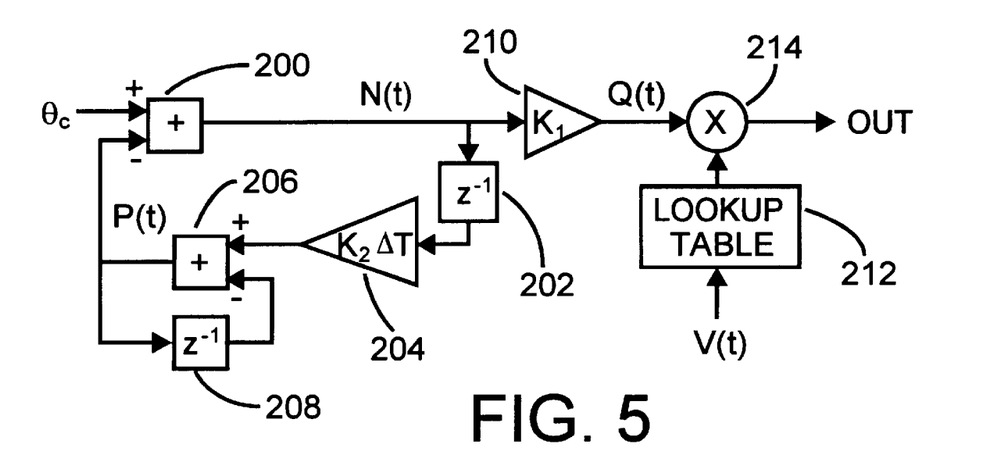
FIG. 5 is a block diagram of an alternative embodiment of an active damping portion of the controller of FIG. 2.

FIG. 5 shows a schematic diagram of an alternative embodiment of active damping block 72, which represents an algorithm implemented on a digital computer comprising controller 16. This alternative embodiment uses an input rotational position signal $\theta_c(t)$ from column rotational position sensor 32 rather than the motor rotational position $M_{12}(t)$ from motor 46. This signal may be used directly from the sensor (raw) or amplified. The raw signal has greater range but less resolution; the amplified signal has better resolution but more limited range. If the signal from column rotational position sensor 32 is used, it would more likely be the amplified signal, due to its high resolution.

Referring to FIG. 5, the amplified column position signal $\theta_c(t)$ is provided to one input of a summing block 200, the other input of which receives a quantity P(t). These quantities are added to form an output N(t), which is delayed one loop in a delay block 202; and the delayed value is then multiplied by a gain constant $K_2\Delta t$ in block 204 and provided to one input of a summing block 206, the output P(t) of which is fed back negatively to the other input:

$$P(t)=K_2\Delta t\, N(t-1)-P(t-1); N(t)=\theta_c(t)+P(t)$$

N(t) is then multiplied by a gain constant $K_1$ in gain block 210 to form a quantity Q(t):

$$Q(t)=K_1 N(t)$$

Finally, as in the embodiment of FIG. 3–4, the vehicle velocity from line 14 is provided to a look up table 212 to select a velocity multiplier $G_V$, which is multiplied times Q(t) in multiplier block 214 to provide the active damping torque output $T_{AD}(t)$ on line 74:

$$T_{AD}(t)=G_V Q(t)$$

Figure 6:
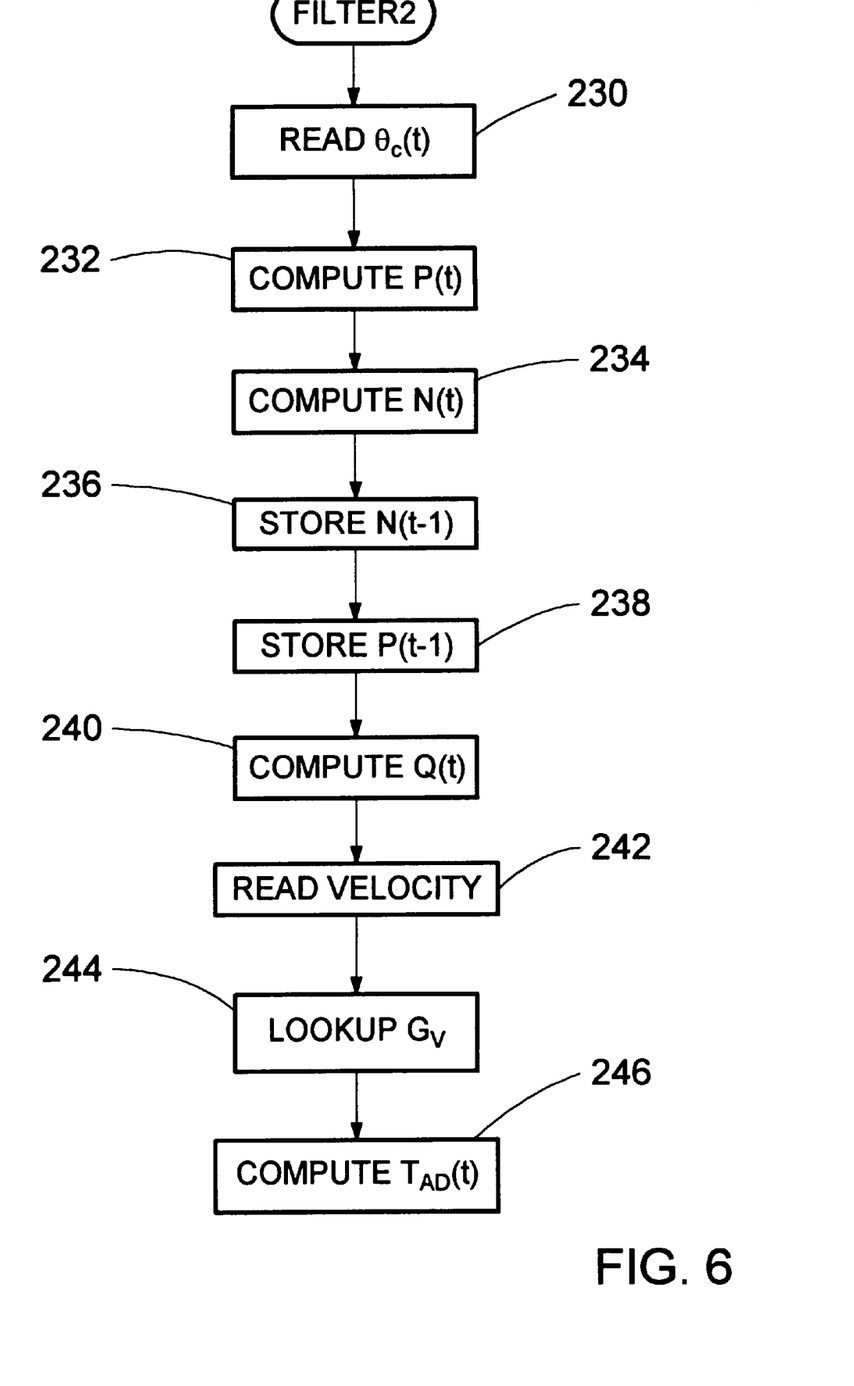
FIG. 6 is a flow chart illustrating the process of the block diagram of FIG. 5.

The flow chart of FIG. 6 shows the algorithm of FIG. 5 in a form adapted to a program for a digital computer. Program FILTER2 begins with step 230, in which the program reads $\theta_c(t)$. In step 232, the program computes $P(t)=K_2\Delta t\, N(t-1)-P(t-1)$. In step 234, the program computes $N(t)=\theta_c(t)+P(t)$. In step 236, the program copies the present value of N(t) to N(t-1) in preparation for the next loop. In step 238, the program copies the present value of P(t) to P(t-1) in preparation for the next loop. In step 240, the program computes $Q(t)=K_1 N(t)$. In step 242, the program reads the vehicle velocity. In step 244 the program performs a table lookup on the vehicle velocity to derive the velocity multiplier $G_V$; and in step 246, the program computes $T_{AD}(t)=G_V Q(t)$.

Figure 7:
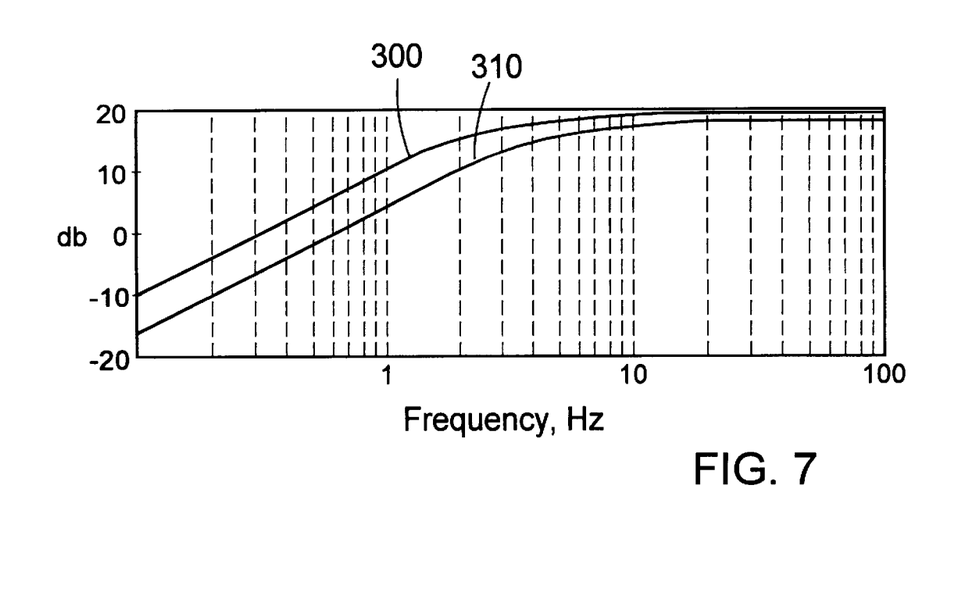
FIG. 7 shows plots of amplitude as a function of frequency for the embodiment of FIG. 3, 4 and the embodiment of FIG. 5, 6.
Figure 8:
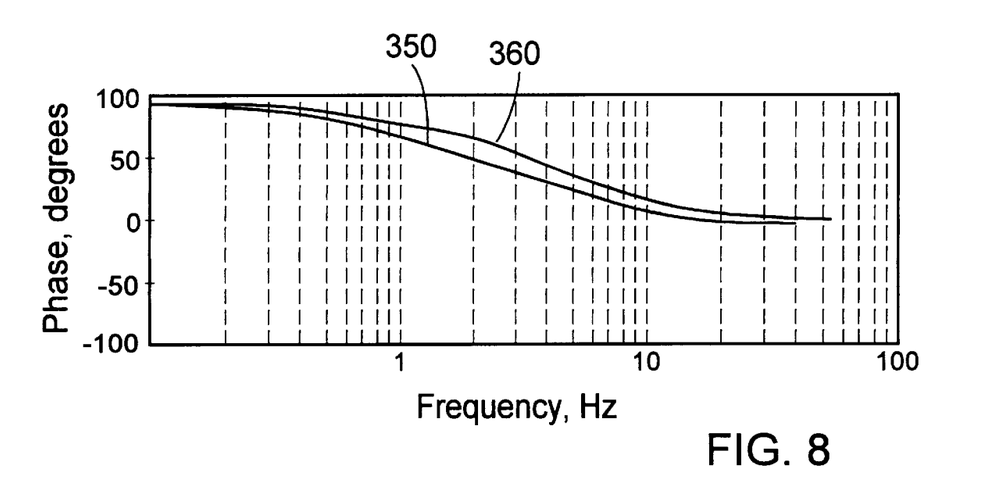
FIG. 8 shows plots of phase as a function of frequency for the embodiment of FIG. 3, 4 and the embodiment of FIG. 5, 6.

As with the embodiment of FIG. 3–4, the embodiment of FIG. 5–6 provides a filter comprising an differentiator up to about 2 Hz but rolls off above this frequency, relative to a differentiator, to avoid amplifying high frequency noise. The amplitude plots of the two embodiments are shown in FIG. 7; and their phase plots are seen in FIG. 8. In FIG. 7, the amplitude of the embodiment of FIG. 3–4 is shown in line 300; and the amplitude of the embodiment of FIG. 5–6 is shown in line 310. In FIG. 8, the phase of the embodiment of FIG. 3–4 is shown in line 350; and the phase of the embodiment of FIG. 5–6 is shown in line 360.

It may be noted that each embodiment is set up in such a way that the filter cut-off frequency, above which it is not a differentiator, may be shifted up or down with the change of a single stored number. In the embodiment of FIG. 3–4, this number is constant $G_2$ at 112; in the embodiment of FIG. 5–6, this number is constant $K_2$ at 204. This is useful for calibration of a particular vehicle; and it also allows adaptive change of the frequency in vehicle use in response to one or more vehicle or external parameters. In either embodiment, this value may be changed for calibration or adaptive control purposes.

We claim:

1. In a vehicle with an electric power steering system having a steering shaft coupled to a vehicle wheel, an electric motor coupled to the steering shaft, means for determining a driver assist torque and means responsive to the driver assist torque to provide a motor command signal to the electric motor, the steering shaft having a resonant frequency of rotational oscillation in free control mode, the improvement comprising:

means for generating a steering shaft position signal;

means for filtering the steering shaft position signal, the filtering means having amplitude and phase characteristics of a differentiator from zero Hertz through the resonant frequency of rotational oscillation in free control mode with amplitude and phase lead decreasing relative to those of a differentiator at rotational oscillation frequencies greater than the resonant frequency of rotational oscillation in free control mode;

means for multiplying the filtered steering shaft position signal by a vehicle velocity factor derived from sensed vehicle velocity to provide an active damping torque; and means for summing the driver assist torque and the active damping torque, the means responsive to the driver assist torque being responsive to the sum in providing the motor command signal to the electric motor.

2. The improved vehicle of claim 1 in which the electric motor is provided with one or more rotor position sensors used in the control thereof and rotor position signals from the rotor position sensors are provided as the steering shaft position signal.

3. The improved vehicle of claim 2 in which the means for filtering the steering shaft position signal comprises a digital filter algorithm which begins by determining the difference between two consecutive digital rotor position signals and then clips the difference to a digital signal having a smaller, more convenient number of bits by elimination of non-significant zero bits.

4. In a vehicle with an electric power steering system having a steering shaft coupled to a vehicle wheel, an electric motor coupled to the steering shaft, means for determining a driver assist torque, means for determining a return to center torque and means for summing the driver assist torque and the return to center torque to provide a motor command signal to the electric motor, the steering shaft having a resonant frequency of rotational oscillation in free control mode, the improvement comprising:

means for generating a steering shaft position signal;

means for filtering the steering shaft position signal, the filtering means having amplitude and phase characteristics of a differentiator from zero Hertz through the resonant frequency of rotational oscillation in free control mode with amplitude and phase lead decreasing relative to those of a differentiator at rotational oscillation frequencies greater than the resonant frequency of rotational oscillation in free control mode;

means for multiplying the filtered steering shaft position signal by a vehicle velocity factor derived from sensed vehicle velocity to provide an active damping torque;

the means for summing the driver assist torque and the return to center torque being further effective to sum the active damping torque therewith in providing the motor command signal to the electric motor.

5. The improved vehicle of claim 4 in which the electric motor is provided with one or more rotor position sensors used in the control thereof and rotor position signals from the rotor position sensors are provided as the steering shaft position signal.

6. The improved vehicle of claim 5 in which the means for filtering the steering shaft position signal comprises a digital filter algorithm which begins by determining the difference between two consecutive digital rotor position signals and then clips the difference to a digital signal having a smaller, more convenient number of bits by elimination of non-significant zero bits.

\* \* \* \* \*